United States Patent [19]

Kurek

[11] Patent Number: 5,254,138
[45] Date of Patent: Oct. 19, 1993

[54] FUEL COMPOSITION CONTAINING A QUATERNARY AMMONIUM SALT

[75] Inventor: Paul R. Kurek, Barrington, Ill.

[73] Assignee: UOP, Des Plaines, Ill.

[21] Appl. No.: 878,369

[22] Filed: May 4, 1992

Related U.S. Application Data

[63] Continuation-in-part of Ser. No. 695,055, May 3, 1991, abandoned.

[51] Int. Cl.$^5$ ............................ C10L 1/18; C10L 1/22
[52] U.S. Cl. .......................................... 44/347; 44/338; 44/422
[58] Field of Search ......................... 44/347, 422, 338; 252/34, 51.5 A; 548/545, 546; 564/281

[56] References Cited

U.S. PATENT DOCUMENTS

| | | | |
|---|---|---|---|
| 3,017,360 | 1/1962 | Cyba | 252/34 |
| 3,216,941 | 11/1965 | Vries | 44/347 |
| 3,676,089 | 7/1972 | Morris | 44/347 |
| 3,962,104 | 6/1976 | Swietlik et al. | 252/34 |
| 4,171,959 | 10/1979 | Vartanian | 44/347 |
| 4,388,200 | 6/1983 | Volkovich et al. | 252/34 |
| 4,614,522 | 9/1986 | Buckley | 252/51.5 A |
| 4,631,070 | 12/1986 | Plavac | 44/347 |

FOREIGN PATENT DOCUMENTS

| | | | |
|---|---|---|---|
| 0646901 | 8/1962 | Canada | 44/422 |

*Primary Examiner*—Margaret B. Medley
*Attorney, Agent, or Firm*—Thomas K. McBride; Eugene I. Snyder

[57] ABSTRACT

Conductive fuel detergent compositions which posses not only the desirable characteristics of minimizing unwanted deposits on internal engine surface such as intake systems or port fuel injectors and exhibiting anti-corrosion characteristics but also have conductive properties comprise quaternary succinimides which are characterized by having an oligomeric alkyl moiety on the succinimide ring. The additive may be prepared by condensing a (polyalkyl)succinic anhydride with a polyamino hydroxyalkyl quaternary ammonium salt, where the latter is formed by the reaction of a Ω-haloepoxide with a tertiary amine followed by reaction of the resulting product with a polyamine.

7 Claims, No Drawings

FUEL COMPOSITION CONTAINING A QUATERNARY AMMONIUM SALT

CROSS REFERENCE TO RELATED APPLICATION

This application is a continuation-in-part of my copending application, Ser. No. 07/695,055, filed May 3, 1991 now abandoned, all of which is hereby incorporated by reference.

BACKGROUND OF THE INVENTION

The present invention is directed to compositions of matter which are useful as additives for fuels such as gasoline utilized in spark-ignition engines.

With the advent of more sophisticated internal combustion engines and environmental requirements, the necessity for providing suitable fuels such as gasoline which contain additives has become increasingly important. It is well known that the hydrocarbon fuels such as gasoline which are used in these internal combustion engines contain numerous deposit-forming substances which, after a period of time, will inhibit the efficiency of the engine. The formation of deposits on and around areas of the engine which are contacted by the fuel will tend to adversely affect the operation of the engine and the vehicle in which the engine is situated. Some specific areas of the engine upon which the deposits are formed will include carburetor ports, the throttle, engine intake valves, the combustion chamber, etc. For example, clean valve intake systems and combustion surfaces are of primary importance, in order to reduce emissions, give improved gas mileage as well as improving the performance of the engine. Another important area which is vital to the performance of the automobile is the port fuel injectors. Any deposits which collect in the needle valve area can partially or totally block the flow of gas, thus resulting in poor performance, increased emissions, smoke and starting problems. Likewise, deposits on the carburetor throttle body and ventures increase the fuel-to-air ratio of the gas mixture to the combustion chamber thereby increasing the amount of unburned hydrocarbon and carbon monoxide which is discharged from the chamber. The high fuel to air ratio also reduces the gas mileage which is obtained. As was previously stated, the engine intake valves should be maintained in a clean state inasmuch as deposits on the valves, when they amount to a sufficiently heavy coating, will restrict the gas mixture flow into the combustion chamber. The restriction of the gas flow will in effect starve the engine of air and fuel and thus will result in a loss of power. The deposits on the valves will also increase the probability of valve failure due to burning, sticking, and improper valve seating.

Another problem with utilizing gasoline as a fuel is that gasoline may contain a certain amount of water as well as oxygen. The combination of oxygen, water and fuel in contact with ferrous metals which are utilized in many parts of the engine will result in the formation of corrosion products which interferes with the operation of the vehicle's fuel system and engine parts. The corrosion of the engine parts such as the fuel storage tank, fuel lines and injectors will interfere with the vehicle's operation thus resulting in a shorter engine life as well as the efficiency of the engine.

In addition to the problems attendant to the formation of deleterious deposits in the engine itself, the question of emissions from the exhaust system of the automobiles or trucks has also become a major problem. Major changes in the formulation of gasoline in order to reduce these noxious emissions are being proposed. These formulations will result in extremely clean fuels with low conductivity and will also afford fuels with lower vapor pressure. The clean, low vapor pressure fuels, especially gasoline, may become a safety hazard at the refinery, terminal loading racks or even at gasoline stations when the gasoline is pumped into the fuel tank of an automobile or truck. This is due in part to the fact that gasoline builds up static caused by the rapid loading procedures which are now in effect. Inasmuch as the high vapor pressure of present gasolines leads to displacement of oxygen, resulting in vapors that are too rich to burn, the chance of fire or explosion is diminished since the corona discharge of static at the loading places is quenched and dissipated. However, the new low vapor pressure gasolines will not have a sufficient amount of vapor release to displace oxygen resulting in a more combustible mixture in the vapor space over the liquid fuel during the loading operation. Subsequent static buildup with release as a corona discharge then becomes a major safety problem. In order to overcome this problem, fuel additives which possess a conductivity characteristic will be required which bleed away the static charge buildup on the tank walls to grounding wires which will dissipate the electrical energy to the ground.

In view of the problems which are attendant to present and future fuels such as gasoline, it is necessary that an additive be utilized with the gasoline which possesses the desirable properties of being able to control deposits on the internal parts of the engine, act as a corrosion inhibitor, possess surfactant, and to have antistatic and conductivity properties. As will be shown in greater detail, the conductive fuel detergent composition or additive of the present invention will fulfill these requirements.

Several United States Patents address the problems which have been previously set forth with regard to efficient operation of the gasoline engine. For example, U.S. Pat. No. 4,600,409 describes a fuel additive comprising a quaternized polyoxyalkylene polyamine or polyether polyamine which is utilized in fuel compositions containing a major amount of a liquid hydrocarbon fuel boiling in the gasoline range. The additive is said to consist of three parts, the first being the polyether or polyoxyalkylene moiety which may or may not be capped by a hydrocarbo moiety. The polyether moiety is bound to a second moiety, through a connecting group or linkage to the nitrogen atom of the third moiety, the amine, which is quaternized by an appropriate alkyl halide. Another U.S. Pat. No. 3,468,640 also describes an additive or gasoline comprising a quaternary ammonium base which is soluble in oil and gasoline. In addition, U.S. Pat. No. 4,132,657 describes a class of amphoteric surfactants which are utilized in the treatment of metal surfaces. These surfactants comprise ethoxylated amines which are quaternized and at least partially phosphated. These surfactants are utilized to treat metal surfaces to improve the lubricating, rust and corrosive inhibiting properties of the surfaces. U.S. Pat. Nos. 4,564,372 and 4,581,151 both disclosed quaternized polyoxyalkylene polyamines or polyetheramines of various compositions which may be used as fuel additives. These are similar in nature to the compounds disclosed in previously discussed U.S. Pat. No. 4,600,409.

The patentees of U.S. Pat. No. 4,388,200 have described compositions touted as dispersants and/or detergents for lubricating oils which resemble those of the current application, although it is noteworthy that the patentees use their materials for totally different purposes than does applicant here, and applicant utilizes quite different properties of the compositions (viz., conductivity) than do the patentees (viz., detergency). It also is noteworthy that the patentees require that the quaternary ammonium function be incorporated in a pyridine ring, quite different and more restrictive than is the case with the instant invention.

BRIEF SUMMARY OF THE INVENTION

This invention relates to conductive fuel detergent additives and to the process for the preparation of these additives. Due to the particular configuration of the molecule and to the particular moieties which are present in the compound, it is possible to impart certain desirable characteristics and properties to the compound which when added to fuels such as gasoline will control deposits on engine surfaces, inhibit the corrosion of these parts as well as provide surfactant, antistatic, microbiocide and conductivity properties to the fuel.

It is therefore an object of this invention to provide improved conductive fuel detergent additives.

A further object of this invention is to provide a process for preparing the conductive fuel detergent additives.

In one aspect an embodiment of this invention resides in a process for the preparation of a conductive fuel detergent composition comprising an N-substituted succinimide where 1) the succinimide moiety bears an oligomeric alkyl group of molecular weight from 100–3000, and 2) the imido nitrogen bears a substituent having a terminal quaternary ammonium moiety with three alkyl groups and a hydroxyl group $\beta$ to a nitrogen other than the imido or quaternary ammonium nitrogen. The detergent composition is the condensation product of a (polyalkyl)succinic anhydride with the reaction product of a haloepoxide and a tertiary amine subsequently reacted with a polyamine. The conductive fuel detergent composition has the generic formula:

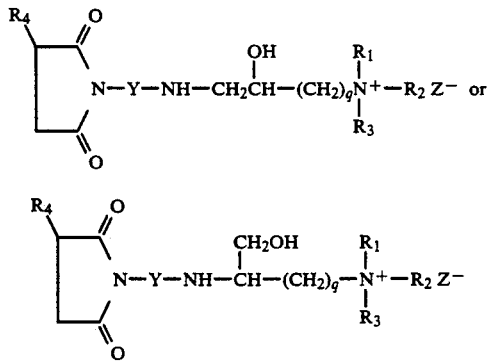

in which $R_4$ is an alkyl radical of molecular weight from about 100 up to about 3400;

$R_1$, $R_2$, and $R_3$ are independently selected from the group consisting of alkyl, hydroxyalkyl, alkoxyalkyl, cycloalkyl, and polyoxyalkyl radicals, or where $R_2+R_3$ is part of a non-aromatic heterocyclic ring;

Z is selected from the group consisting of halide, hydroxy, acetate, and methylsulfate ions;

Y is an alkylene, aminoalkylene or oxyalkylene moiety; and q is an integer of from 1 to about 10.

Another embodiment of this invention is the foregoing conductive fuel detergent composition.

A specific embodiment of this invention is found in a process for the preparation of a conductive fuel detergent of the foregoing composition which comprises condensing an alkylsuccinic anhydride with the quaternary ammonium salt formed by 1) the reaction of a halogen-substituted epoxide with a tertiary amine at a temperature in the range of from about 0° to about 100° C. and a pressure in the range of from about atmospheric to about 1000 pounds per square inch, followed by 2) reacting the product of 1) with a polyamine at a temperature in the range of from about 23° to about 200° C., at condensation conditions which include a temperature in the range of from about 0° to about 200° C. and a pressure in the range of from about atmospheric to about 1000 pounds per square inch in the presence of a diluent such as toluene to form the desired conductive fuel detergent composition.

Other objects and embodiments of the present invention can be found in the following further detailed description of the invention.

DETAILED DESCRIPTION OF THE INVENTION

As previously stated, the present invention is concerned with conductive fuel detergent additives and with a process for the preparation of these additives.

Previously, quaternary polyolefins which have been used as carburetor detergents or other additives were formed by the alkylation of a polyalkylsuccinimide polyamine or polyolefin amines using alkylhalides as shown in U.S. Pat. No. 4,171,959 or by the condensation of a polyvinyl pyridine with an alkyl halide or α, β unsaturated carboxylic acids to give polyvinyl pyridinium alkyl salts as set forth in U.S. Pat. No. 4,201,554.

In contradistinction to this, the conductive fuel detergent compositions or additives of the present invention are quaternary succinimides which possess an oxygen-containing substituent on a β carbon atom adjacent to a secondary amine and which are formed by condensing a (polyalkyl)succinic anhydride with a polyamino hydroxyalkyl quaternary ammonium salt which has been formed by the reaction of an omega-halo-1,2-epoxyalkane,

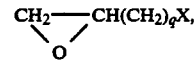

with a tertiary amine followed by reacting the resultant product with a polyamine. The resultant conductive fuel detergent composition will be utilized as an additive to hydrocarbon fuels to provide the desirable characteristics of the fuel which have been previously described in greater detail.

The reaction between the (polyalkyl)succinic anhydrides and the polyamino hydroxyalkyl quaternary ammonium salt of the types set forth within will be effected at reaction conditions which will include a temperature in the range of from about 0° to about 200°

C. and a pressure in the range of from about atmospheric to about 1000 pounds per square inch. In addition, if so desired, this reaction may also be effected in the presence of a solvent selected from the group consisting of aromatic, cycloparaffinic, naphthalenic compounds and natural or synthetic oils. Specific examples of these solvents include benzene, toluene, diisomeric xylenes, cyclohexane, cycloheptane, naphthalene, lube oil, castor oil, mineral oil, etc.

The reaction between the haloepoxide and the tertiary amine will be effected at reaction conditions which include a temperature in the range of from about 0° to about 200° C. and a pressure in the range of from about atmospheric to about 1000 pounds per square inch. Likewise, the conditions which are employed in the reaction between the product of the foregoing reaction and the polyamine to form the polyamino hydroxyalkyl quaternary ammonium salt will also include conditions such as a temperature in the range of from about 0° to about 200° C. and a pressure in the range of from about atmospheric to about 1000 pounds per square inch. If so desired the reactions involving the haloepoxide, tertiary amine, and the polyamine may be effected in the presence of an alcoholic solvent such as methanol, ethanol, propanol, polyglycol, 2-methoxyethanol, etc. Generally speaking, in the aforesaid reactions and condensation when superatmospheric pressures are employed, the desired operating pressure will be provided for by the introduction of an inert gas such as nitrogen, argon, helium, etc. into the reaction vessel to provide the desired operating pressure.

One major class of reactants leading to the fuel additives of this invention is that of the Ω-halogen substituted 1,2-epoxyalkanes, i.e., Ω-halo-1,2-epoxyalkanes of the formula

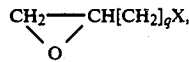

where X is chlorine, bromine, and to a lesser extent iodine, and where q is an integer from 1 up to about 10. The example where $X=Cl$ and $q=1$ affords the familiar epichlorohydrin, which is the most common and most desirable of the Ω-halo-1,2-epoxyalkanes. However common may be epichlorohydrin, it needs to be clearly understood that other members of this class also may be used in the practice of my invention which encompasses the entire designated class of haloepoxides.

The haloepoxides described above are reacted with tertiary amines, $R_1R_2R_3N$, to afford the quaternary ammonium portion which is ultimately incorporated in the fuel detergent composition according to the reaction,

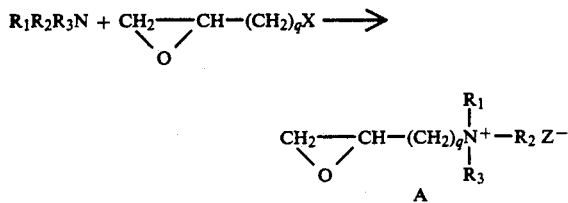

Although $R_1$, $R_2$, and $R_3$ may be independently selected from the group consisting of alkyl, oxyalkyl, cycloalkyl, and non-aromatic heterocyclic moieties, it is most common for them to be alkyl moieties, and especially lower alkyl moieties having from 1 up through about 6 carbon atoms, and of these the case where each is a methyl group, i.e., the amine reacting with the epoxide is trimethylamine, is the most common. Another preferred class is that where at least one, and more commonly all three, of the R groups are hydroxy- or alkoxyalkyl moieties, such as methoxyethyl, methoxymethyl, methoxypropyl, methoxybutyl, ethoxyethyl, ethoxypropyl, ethoxybutyl, hydroxymethyl, hydroxyethyl, hydroxypropyl, and so forth. It will be recognized that the foregoing alkoxyalkyl groups result from the reaction of an alcohol and an epoxide.

Another important class of amines used to form the quaternary ammonium group arises from the case where the nitrogen is part of a non-aromatic heterocycle such as pyrrolidine, piperidine, and morpholine. In these cases it will be recognized that $R_2+R_3$ represents the non-nitrogen portion of the heterocycle; e.g., where the heterocycle is morpholine $R_2+R_3$ is $-CH_2CH_2-O-CH_2CH_2-$.

Although originally $Z^-$ is perforce a halide ion, arising as it does from Ω-halo-1,2-epoxyalkanes, it is a cation susceptible of exchange with a variety of other cations. Such exchange may be performed with A, with B and C, or with D and E as a matter of choice with equivalent results. Ultimately our choice for $Z^-$ is a halide, especially chloride or bromide, hydroxide, acetate, and methylsulfate.

The foregoing product A is then reacted with polyamines which are at least diamines and which have at least two, and usually only two, primary amino moieties at their termini according to the reaction,

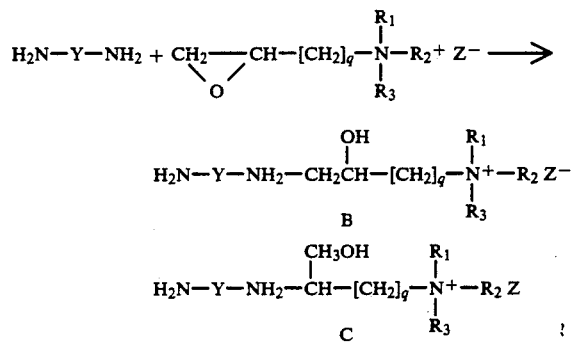

Examples of suitable polyamines, $H_2N-Y-NH_2$, include ethylenediamine, 1,2-propylenediamine, 1,3-propylenediamine, the isomeric butylenediamines, pentanediamines, hexanediamines, heptanediamines, diethylenetriamine, dipropylenetriamine, dibutylenetriamine, triethylenetetramine, tetraethylenepentamine, pentaethylenehexamine, hexamethylenetetramine, and bis(hexamethylene) triamine and aromatic diamines such as the diaminobenzenes and diaminopyridines. Another important class of polyamines are the Ω-aminopoly(alkyleneoxy)alkyl amines, which are the amine analogs of the poly(alkyleneoxy)glycols, and which are, or can be viewed as, the reaction product of ammonia and epoxides (ethyleneoxides), especially the lower epoxides having 2–4 carbon atoms. This class of materials has the general formula $H_2N[RCH-CH_2-O]_sRCH-CH_2NH_2$, where s is an integer, and those where s is from 1 up through about 10 are particularly useful. Where $R=H$ the diamine originates from ethyleneoxide, where $R=CH_3$ the diamine originates from propyleneoxide, and where $R=C_2H_5$ the diamine originates from butyleneoxide. This class can be further generalized by the formula $H_2N[RCH-CH_2-O]_s[R'-CH-CH_2-O]_t[R''CH-CH_2-O]_uRCH-CH_2NH_2$ where each of s, t, and u are integers and whose sum is an integer from three to 10, and where each of $R'$ and $R''$ are hydrogen, a methyl, or an ethyl moiety.

The last stage in the preparation of the conductive fuel detergent compositions of the present invention is the reaction between the aforedescribed reaction products, designated as B and C, and the alkyl succinic anhydrides of this invention according to the reaction,

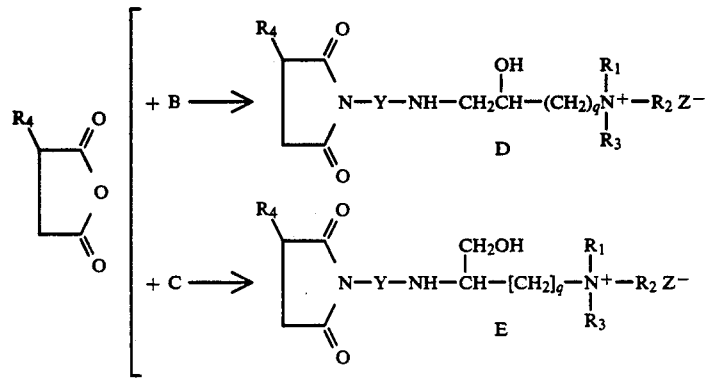

The succinic anhydrides which are used in the practice of this invention are monoalkyl succinic anhydrides, where the alkyl moiety, $R_4$, has a molecular weight between about 100 and about 3000. Although in practice this means that the alkyl moiety may have as few as seven carbon atoms, in the more usual case the alkyl moiety is an oligomer of one of the lower olefins, i.e., an oligomer of a C2 through about a C5 olefin. Examples of the alkyl groups which may be present on the succinic anhydrides used in the practice of this invention include but are not limited to heptyl, octyl, nonyl, decyl, undecyl, dodecyl, tridecyl, tetradecyl, pentadecyl, hexadecyl, heptadecyl, octadecyl, nonadecyl, eicosyl, and those moieties with a molecular weight up to about 3000 which may be viewed as oligomers of ethylene, propylene, 1-butene, 2-butene, 2-methylpropene (isobutylene), and the pentenes. Those cases where the alkyl group is an oligomer of isobutylene are especially favored in the practice of this invention, and the resulting (polyisobutylene)succinic anhydrides have the acronym PIBS.

While the above discussion concerning the preparation of quaternary succinimides has centered upon the process leading to their formation, it is contemplated that the desired composition of matter may also be prepared in a different process. The desired compound may be prepared by condensing an N-alkylamino polyalkylsuccinimide which has been formed by the reaction of a (polyalkyl)succinic anhydride with a polyamine at a temperature in the range of from about 100° to about 200° C. and a pressure in the range of from about atmospheric to about 1000 pounds per square inch, with an epoxyalkyl quaternary ammonium salt which has been formed by the reaction of a substituted haloepoxide with a tertiary amine at a temperature in the range of from about 0° to about 200° C. and a pressure of an inert gas in the range of from about atmospheric to about 1000 pounds per square inch. The condensation of the N-alkylamino polyalkylsuccinimide and the epoxyalkyl quaternary ammonium salt will also be effected at condensation conditions which will include a temperature in the range of from about 0° to about 200° C. and a pressure of an inert gas in the range of from about atmospheric to about 1000 pounds per square inch.

As will hereinafter be shown in greater detail, the quaternary succinimides of this invention impart desirable characteristics to fuels with regard to controlling the deposit of unwanted material on internal engine surfaces and inhibiting the corrosion of internal engine parts while also functioning as a surfactant, antistatic, and conductivity agent.

The following examples are given for purposes of illustrating a method for preparing conductive fuel detergent compositions of the present invention as well as the use thereof in fuels. However, it is to be understood that these examples are given merely for purposes of illustration, and that the present invention is not necessarily limited thereto.

EXAMPLE I

A conductive fuel detergent composition was prepared by adding under a nitrogen atmosphere 200 grams of methanol and 18.50 grams (0.25 mol) of 1,3-propylenediamine to a 1 liter round bottom flask equipped with a stirring paddle, Dean Stark trap, addition funnel, thermometer and thermowatch, and a Y-adapter. The reaction mixture was heated to reflux (65° C.) following which 37.9 grams (0.25 mol) of glycidyl trimethyl ammonium chloride in 100 milliliters of methanol was slowly added dropwise at a rate of 1 drop/second over a period of about ½ to 1 hour while maintaining the reaction mixture at reflux with constant agitation. The reaction mixture was maintained at this reflux temperature of 65° C. for a period of four hours following which the methanol solvent was removed by distillation to leave a viscous liquid. The viscous liquid was then added to a solution of 262 grams (0.25 mol, 1048 molecular weight) of polyisobutenylsuccinic anhydride in 318 grams of toluene, the addition being made at the reflux temperature of the mixture which was about 110° C. The mixture was allowed to react for a period of seven hours at a temperature of 110° C. in order to ensure complete reaction and to remove the water formed. At the end of this seven hour period, the mixture was cooled, filtered through Celite and analyzed by TGA, IR and NMR techniques. This analysis disclosed that the product comprised a mixture corresponding to structures D and E where $R_4$=polyisobutenyl, $R_1=R_2=R_3=CH_3$, $q=1$, $Y=(CH_2)_3$, and $Z=Cl$.

EXAMPLE II

A conductive fuel detergent additive may be prepared by reacting equimolar amounts of diethylenetriamine and glycidyl trimethyl ammonium chloride, which is formed from the reaction of epichlorohydrin and trimethylamine, in a methanol solvent at reflux. After removal of the methanol solvent, the product is reacted with an equimolar amount of polyisobutenylsuccinic anhydride in a toluene solvent at a temperature of about 110° C. After completion of the predetermined residence time, the product mixture of D and E, where $R_1=R_2=R_3=CH_3$, $R_4$=polyisobutenyl, $q=1$, $Y=(CH_2)_2$, and $Z=Cl$ may be recovered.

EXAMPLE III

In this Example, a conductive fuel detergent additive may be prepared by reacting equimolar amounts of 4,9-dioxadodecane-1,12-diamine, $NH_2(CH_2)_3O(CH_2)_4O(CH_2)_3NH_2$, which is the reaction product of the sodium salt of tetramethylene glycol with 2 molar equivalents of 3-chloropropylamine, with glycidyl tris-(ethoxyethyl) ammonium hydroxide in a manner similar to that set forth in the above examples. The product resulting from this reaction may then be reacted with polyisobutenylsuccinic anhydride also in a manner similar to that set forth in the above examples to form the desired product mixture of D and E, where $R_1=R_2=R_3=C_2H_5OCH_2CH_2$, $R_4$=polyisobutenyl, $q=1$, $Y=(CH_2)_3O(CH_2)_4O(CH_2)_3$, and $Z=OH$.

EXAMPLE IV

In this Example, the conductive fuel detergent additive may be prepared by reacting bis(6-aminohexyl)amine [bis(hexamethylene)triamine] with glycidyl trimethylammonium acetate in equimolar amounts in a methanol solvent at reflux temperature. The product resulting from this reaction may then be reacted with polyisobutenylsuccinic anhydride in equimolar amounts in a toluene solvent at a temperature of about 110° C. to form as the major product D and E, where $R_1=R_2=R_3=CH_3$, $R_4$=polyisobutenyl, $q=1$, $Y=-[-(CH_2)_6]_2NH$ and $Z=CH_3CO_2$.

EXAMPLE V

In this Example, the desired additive may be prepared by reacting equimolar amounts of 1,4-diaminocyclohexane and glycidyl trimethyl ammonium chloride in an ethanol solvent. The product resulting from this reaction may then be reacted with polypropenylsuccinic anhydride having a molecular weight of about 500 in a toluene solvent at a temperature of about 110° C. to form as the desired product D and E, where $R_1=R_2=R_3=CH_3$, $R_4$=(polyisopropenyl), $q=1$,

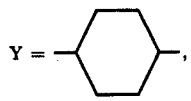

and $Z=Cl$.

EXAMPLE VI

A conductive fuel detergent additive may be prepared by reacting equimolar amounts of 2,6-diaminopyridine and glycidyl trimethyl ammonium chloride which is formed by the reaction of epichlorohydrin with trimethylamine in a methanol solvent at a temperature of about 65° C. for a period of about 4 hours. The resulting product from this reaction, after removal of the solvent, may then be reacted with an equimolar amount of polyisobutenylsuccinic anhydride in a solvent comprising toluene at a temperature of about 110° C. to form as the desired product a mixture of D and E, where $R_1=R_2=R_3=CH_3$, $R_4$=(polyisobutenyl), $q=1$,

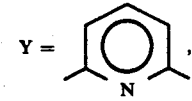

and $Z=Cl$.

EXAMPLE VII

To demonstrate the efficacy of the conductive fuel detergent additive of the present invention, a series of tests were run. An additive of the present invention was compared with a commercially available polyether amine and to a reference fuel or isooctane.

One test comprised an intake system deposit study to evaluate a keep clean performance utilizing dosages of 60 and 200 ppm additive while the second study evaluated cleanup performance at a dosage of 200 ppm additive. During the testing, fuel was metered from a reservoir to a spray nozzle where it was mixed with air and expelled in a flat spray pattern across an open span of 3 inches onto a heated, preweighed deposit-collecting tube. The weight gain of the deposit tube is the ISD index, reported in milligrams per 200 milliliters. The spray nozzle has a water cooling jacket to prevent fuel vaporization within the nozzle, which could cause erratic flow. The aluminium or stainless steel tube is electrically heated by a rod inserted into the tube. The wall of each deposit tube is drilled axially for insertion of a thermal couple to measure the deposit tube skin temperature, and the deposit tube is positioned so that thermal couple side of the tube faces the spray nozzle. Testing of each 200 milliliter sample requires approximately 2 hours (1⅜ hours for spraying the test fuel onto the deposit tube, a 10-minute heat soak, and tube cooling time).

Another test comprised a port fuel injector study to evaluate keep clean performance utilizing dosages of 60 ppm of additive in a reference fuel and a cleanup study utilizing dosages of 200 ppm of additive.

This test consists of four injectors which are installed in a heated block. The injectors are evaluated for their weeping rate until they closely match in flow characteristics. Fuel is supplied at 35 psi to a fuel rail and sprayed through the injectors for a 60 second interval, followed by a static hot soak condition at 160° C. for 60 minutes. Prior to the pulse, there is a 5-minute temperature cutoff to the injectors to avoid vapor lock. The pulse lasts for 60 seconds and the operation is cycled 22 times for a total of 23 hours or an equivalent of 1500 miles of vehicle operation. The test simulates an accelerated formation of deposits (% fouling) in cars equipped with port fuel injectors. Deposit formation was determined by measuring the flow of gasoline emitted through the injector at various intervals using a reference fuel with and without additive. Flow measurement precision was approximately 0.5% and the uncertainty was <1 g/min. Gasoline pressure was maintained by use of a regulator which kept pressure on the injectors when the fuel pump was not in operation. Deposit formation (fouling) can be influenced by increasing or decreasing temperature, pressure or soak time as well as the number of test cycles.

In cleanup testing, a reference fuel is run to build up deposits in the pintle area of the injectors first, then the additive dosed gasoline is sprayed through the injectors. The % fouling is determined by taking the average amount of gasoline that flowed through the clean injectors, subtracting the flow through the fouled injectors, dividing the result by the flow through the clean injectors, and multiplying by 100. The same cycle operation and temperature is used. Generally the dosage of the additive is increased and can range from 10 to 3000 ppm with typical dosages in the range of 100 to 300 ppm.

Another test comprised a corrosion test which was run according to ASTM D665-83. The test was run for a period 3.5 hours at a temperature of 100° F.

Thermal stability of the additive was determined by a thermal gravimetric analysis in nitrogen gas. Another test was a water demulsibility test performed according to ASTM D1094-67 using a dosage of 200 ppm. The results of these tests are set forth in the table below in which the additive of the present invention, prepared according to Example I above, was labeled "A", the commercially available polyether amine was labeled "B", and the reference fuel was labeled "C".

TABLE

| TYPE OF TEST | A | B | C |
| --- | --- | --- | --- |
| Intake System Deposit | | | |
| Keep Clean (60 ppm) | 1 mg | 1.5 mg | 1.9 mg |
| Keep Clean (200 ppm) | 0.04 mg | 0.1 mg | 1.9 mg |
| Clean Up (200 ppm) | 20 | 25 | 0 |
| % Clean Up | | | |
| Port Fuel Injector Test | | | |
| Keep Clean (60 ppm) % Fouled | 0 | 4.3 | 25 |
| Clean Up (200 ppm) | 17 | 14.3 | 35.4 |
| % Fouled | | | |
| Conductivity (U mhos) | 0.004 | 0 | 0 |
| Corrosion Rating | D | E | E |
| (3.5 hrs. at 100° F.) | 50-75% Rust | 75-100% Rust | 75-100% Rust |
| Thermal Stability (TGA, Midpoint) | 430° C. | 408° C. | — |

It is to be noted from the above table that the conductive fuel detergent additive of the present invention possesses more desirable characteristics with regard to minimizing intake system deposits, port fuel injector deposits, increasing conductivity, decreasing corrosion and increasing thermal stability when compared with other additives. In addition, the additive of the present invention also compares favorably with regard to the water demulsibility test in interface, separation, $H_2O$/interface and fuel ratings, compared to the other additives.

I claim as my invention:

1. A conductive fuel detergent composition having the formula:

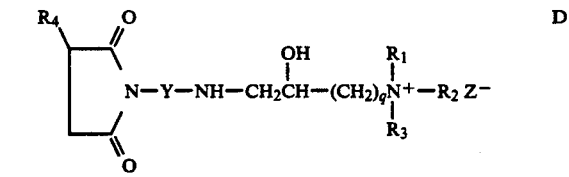

OR

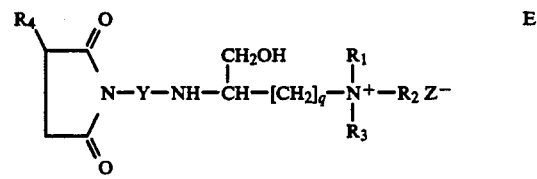

where
$R_1$, $R_2$, and $R_3$ are independently selected from the group consisting of alkyl, hydroxyalkyl, and alkoxyalkyl moieties;

$R_4$ is an alkyl radical of molecular weight from about 100 up to about 3000;

Y is an alkylene, aminoalkylene, or oxyalkylene moiety, wherein N—Y—NH is selected from the group consisting of ethylenediamine, 1,2-propylenediamine, 1,3-propylene diamine, the isomeric butylenediamines, pentanediamines, hexanediamines, heptanediamines, diethylenetriamine, dipropylenetriamine, dibutylenetriamine, triethylenetetraamine, tetraethylenepentaamine, pentaethylenehexaamine, hexamethylenetetramine, and bis(hexamethylene) triamine, the diaminobenzenes, the diaminopyridines, the Ω-aminopoly(alkyleneoxy)alkyl amines of the general formula $H_2N[RCH—CH_2—O]_s[R'CH—CH_2—O[_t[R''—CH—CH_2—O]_uRCH—CH_2NH_2$, where each of s, t, and u is an integer from 1 up through about 10 with the constraint that $1 \leq (s+t+u) \leq 10$, and where R=H, $CH_3$, or $C_2H_5$;

Z is selected from the group consisting of halide, hydroxy, acetate, and methylsulfate; and q is an integer from 1 to about 10.

2. The conductive fuel detergent composition of claim 1 in which $R_4$ is a polyisobutylene oligomer.

3. The conductive fuel detergent composition of claim 1 in which $R_4$ is a polypropylene oligomer.

4. The conductive fuel detergent composition of claim 1 where q=1.

5. The conductive fuel detergent composition of claim 1 where N—Y—NH— is propylenediamine.

6. The conductive fuel detergent composition of claim 1 where each of $R_1$, $R_2$, and $R_3$ is a methyl moiety.

7. The conductive fuel detergent composition of claim 1 where q=1, $H_2N—Y—NH_2$ N—Y—NH— is ethylenediamine, propylenediamine, or hexamethylenediamine, and each of $R_1$, $R_2$, and $R_3$ is a methyl moiety.

* * * * *